US009459102B2

(12) United States Patent
Rathi et al.

(10) Patent No.: US 9,459,102 B2
(45) Date of Patent: Oct. 4, 2016

(54) MANAGING NAVIGATION CHANGES

(75) Inventors: Somya Rathi, Portland, OR (US); Anand P. Rangarajan, Hillsboro, OR (US); Xingang Guo, Portland, OR (US); Vijay Sarathi Kesavan, Hillsboro, OR (US); Victor B. Lortz, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 70 days.

(21) Appl. No.: 13/993,085

(22) PCT Filed: Dec. 30, 2011

(86) PCT No.: PCT/US2011/068047
§ 371 (c)(1),
(2), (4) Date: Jun. 11, 2013

(87) PCT Pub. No.: WO2013/101163
PCT Pub. Date: Jul. 4, 2013

(65) Prior Publication Data
US 2014/0222341 A1    Aug. 7, 2014

(51) Int. Cl.
G01C 21/00    (2006.01)
G01C 21/34    (2006.01)
G01C 21/36    (2006.01)

(52) U.S. Cl.
CPC ........... *G01C 21/00* (2013.01); *G01C 21/3469* (2013.01); *G01C 21/362* (2013.01)

(58) Field of Classification Search
CPC .............................. G01C 21/00; G01C 21/362

USPC .......................................................... 701/538
See application file for complete search history.

(56) References Cited

U.S. PATENT DOCUMENTS

| 7,233,860 | B2 * | 6/2007 | Lokshin et al. ............... 701/423 |
| 2007/0288163 | A1 | 12/2007 | Meyer |
| 2010/0220250 | A1 * | 9/2010 | Vanderwall et al. .......... 348/837 |
| 2014/0365126 | A1 * | 12/2014 | Vulcano ................. G01C 21/36 701/533 |

FOREIGN PATENT DOCUMENTS

| JP | 2005-257554 | | 9/2005 |
| JP | 2005257554 A | * | 9/2005 |
| KR | 2010-0097562 | | 9/2010 |

OTHER PUBLICATIONS

English translation fron JPO of JP 2005257554 A.*
Provisional applicantion spec and drawing attached (U.S. Appl. No. 61/832,818).*
PCT International Search Report and Written Opinion issued in corresponding PCT/US2011/068047 dated Sep. 3, 2012 (12 pages).

* cited by examiner

*Primary Examiner* — Fadey Jabr
*Assistant Examiner* — Yazan Soofi
(74) *Attorney, Agent, or Firm* — Trop Pruner & Hu, P.C.

(57) ABSTRACT

In accordance with some embodiments, multiple navigation changes to a navigation system may be managed. The navigation system may receive and first set of navigation changes. Then, the navigation system may establish communication with a user device. The navigation system may then receive a second set of navigation changes associated with the user device. As a result, the navigation system may merge the first set of navigation changes with the second set of navigation changes.

30 Claims, 4 Drawing Sheets

MANAGING NAVIGATION CHANGES

BACKGROUND

This relates generally to computer systems and more particularly, to navigation systems.

Vehicles today may include integrated navigation systems, which may commonly be referred to as In-Vehicle Infotainment (IVI) systems. When operating a navigation system, drivers may set the destination upon entering the vehicle, and the navigation system may then guide the driver toward the inputted destination along a calculated route.

Frequently, a driver may desire to make on-the-fly changes to the navigation system after embarking on a chosen route to the inputted destination. For example, a driver may want to change the initial route in light of receiving certain information such as traffic delays, road closures, weather conditions, or any other information. As another example, a driver may desire to input specific points of interest (e.g., restaurants, parks, retail stores, etc.).

However, trying to make changes to the navigation system while simultaneously operating the vehicle may prove a cumbersome exercise. Worse, doing so may also pose a significant safety hazard. The distraction posed by the navigation system may greatly increase the likelihood of a vehicular accident, possibly resulting in serious injury. Thus, some manufacturers even partially disable the functionality of the navigation system while the vehicle is in operation. These factors present difficulties in managing changes to the navigation system of a vehicle while driving.

DETAILED DESCRIPTION

Figure 1A:
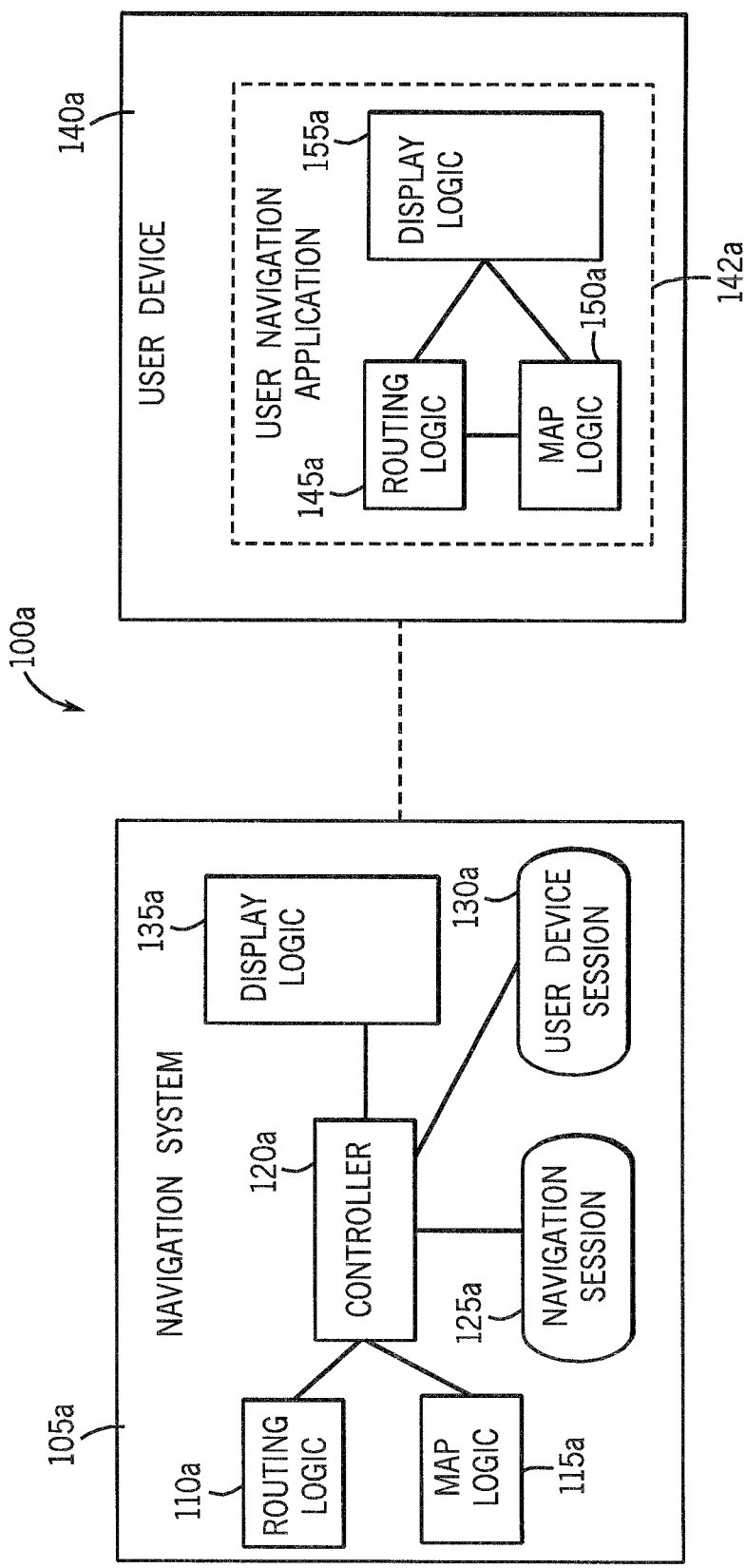
FIG. 1A is a system depiction for one embodiment of the present invention.

In accordance with some embodiments, a first set of navigation changes may be made using the on-board navigation system of a vehicle. Additionally, a second set of navigation changes may be made on a user device. Then, communication may be established between the vehicle navigation system and the user device. Once communication has been established, logic within a controller or integrator on the vehicle navigation system may merge the first and second set of navigation changes. Such changes may include, but are not limited to, destination changes, route changes, searches, points of interest, and other input characteristics.

Thus, a driver may avoid making on-the-fly changes to the vehicle navigation system while operating the vehicle in some embodiments. For example, a passenger with a user device may make navigation changes on the user device while the driver is driving. Then, using any communication protocol such as Bluetooth or WiFi, the passenger may connect the user device with the navigation system. Thereafter, logic within the navigation system may detect the navigation changes on the user device and incorporate those changes into the navigation system.

In communicating with the user device, the navigation system may periodically save a session state of the communication. Thus, if connection between the two systems should somehow be severed, a session having all the information of the last saved state can be resumed upon reconnection.

In one embodiment, multiple user devices may be in communication with the navigation system. To this end, the navigation system may maintain a separate session state for each user device. As a result, the navigation system may support multiple users on multiple devices to make their own navigation changes. As such, the logic within the navigation system may incorporate or merge all the navigation changes from each user device and display a combined view of the changes.

For instance, consider a scenario with a driver, passenger A, and passenger B, with each passenger having his/her own user device. The driver may input an initial destination to the navigation system, and the navigation system may generate a corresponding route. However, while the driver is operating the vehicle, passenger A and passenger B may desire to also visit destinations A and B, respectively. Thus, passenger A and passenger B may input their desired destinations into their respective user devices. Moreover, each of these devices may include a navigation application stored within. Then, each passenger may connect their respective user devices with the navigation system, which may in turn generate respective session states for each user device. As a result, the navigation system may merge the navigation changes from all three sources (i.e., the driver's initial destination, destination A, and destination B) and calculate a route that passes through each destination. In addition, the route may be calculated using any criteria such as finding the fastest route, the shortest route, or using any other conditions.

In some embodiments, a driver may make navigation changes on his own user device before entering his vehicle. Upon initialization of the navigation system in the vehicle, the driver may establish communication between the user device and the navigation system. Then, the navigation system may incorporate the navigation changes from the user device and display the changes on its display. Thus, a driver may be able to conveniently map routes, destinations, and set other points of interest on a device of his choosing before entering the vehicle. These changes can then be accessed by the vehicle navigation system to guide the driver to the inputted destination.

In another embodiment, the navigation system (e.g., an IVI system) may include a navigation server component. As such, when a user device establishes a session with the navigation system, the navigation server may provide an interface for the user device to generate navigation changes directly on the navigation system. These changes may still be saved within the session. Thus, the user device need not have any particular navigation applications of its own to effect navigation changes on the navigation system. Instead, it may use the navigation capabilities of the vehicle navigation system.

In yet another embodiment, a driver or any other user may save navigation changes in a session with a cloud network. Then, upon entering the vehicle, the navigation system may establish communication with the cloud network and retrieve the saved session. To this end, the navigation system may then incorporate the navigation changes in the saved session and display the resulting information to the driver.

For instance, a driver may input navigation changes on a computer, laptop computer, mobile phone, or any other user device. Furthermore, the driver may establish communication between a cloud network and the user device and save the navigation changes in a particular session with the cloud. Thereafter, upon initialization of the navigation system, the navigation system may connect with the cloud network and retrieve the saved session and extract the navigation changes. The navigation system may then incorporate these changes with any other stored navigation changes.

Referring now to FIG. 1A, a system 100a is provided for inputting navigation changes. The system 100a may include a navigation system 105a. In one embodiment, the navigation system 105a may be integrated within a vehicle as part of an In-Vehicle Infotainment (IVI) platform. IVI platforms may include a collection of hardware devices installed in a vehicle to provide a variety of audio and/or visual interaction. For example, IVI platforms may enable playing various audio and visual media, access radio airwaves, access to the Internet, and Global Positioning Satellite (GPS) navigation (e.g., navigation system 105a). One of ordinary skill in the art understands that IVI platforms may include various other components and are not limited to the above features.

Navigation system 105a may include routing logic 110a and map logic 115a. Map logic 115a may enable the navigation system 105a to access various maps or map services to use in navigation. In one embodiment, map logic 115a may receive map data inputted by the user for specific maps that the user desires. In another embodiment, map logic 115a may access third party map engines for map data such as Google Maps, MapQuest, and/or any other map service. In yet another embodiment, map data may already be pre-loaded onto the navigation system 105a. Furthermore, map logic 115a may be capable of interpreting GPS data.

Routing logic 110a may communicate with map logic 115a to determine a particular route to an inputted destination. Such a destination may typically be inputted by a user but may be received from other sources as well. In some embodiments, multiple inputs may be received by the routing logic 110a to determine an appropriate route for a particular destination. Such inputs may include, but are not limited to, weather conditions, traffic conditions, toll roads, known detours, the presence of freeways and/or local roads, distance, time, and manual input from a user to change to a specific route.

As depicted in FIG. 1A, routing logic 110a and map logic 115a may communicate with a controller 120a to generate a navigation session 125a. The controller 120a may also maintain at least one user device session 130a generated from communication with a user device 140a. These sessions will be discussed in more detail below.

The navigation system 100a may also include display logic 135a to display the position of navigation system 100a. Furthermore, display logic 135a may generate a rendering of the position of the navigation system 100a relative to a chosen map of the map logic 115a. Similarly, display logic 135a may also display the position of the navigation system 105a along a particular route determined by routing logic 110a.

The system 100a may also include a user device 140a that may be in communication with the navigation system 105a. To this end, communication between the navigation system 105a and the user device 140a may be established through any wired or wireless means. For example, communication may be established through WiFi, Bluetooth, radio, infrared, Ethernet, Universal Serial Bus (USB) and/or any other communication interface. Moreover, in communicating with the user device 140a, the controller 120a in the navigation system 105a may generate a user device session 130a.

The user device 140a may be any electronic device with processing capabilities including, but not limited to, a mobile phone, laptop computer, tablet computer, personal digital assistant (PDA), and/or netbook.

In an embodiment depicted in FIG. 1A, the user device 140a may include a user navigation application 142a. As such, the user navigation application 142a may include routing logic 145a, map logic 150a, and display logic 155a of its own. These components may perform similar functions to their respective counterparts in the navigation system 105a. As such, a user may devise a set of navigation changes on a user device 140a separate from those made on the navigation system 105a. Such navigation changes may be maintained and/or stored in the user device session 130a on the navigation system 105a.

Thus, the controller 120a may generate separate sessions for the navigation system 105a and for the user device 140a. To this end, a navigation changes made through direct interaction with the navigation system 105a may be captured or stored in the navigation session 125a. Conversely, navigation changes made on the user device 140a may be stored in the user device session 130a. While FIG. 1A depicts only one user device 140a and one user device session 130a, it should be noted that multiple user devices and multiple corresponding user device sessions are also contemplated. In addition to multiple user device sessions, the controller 120a may also simultaneously maintain a cloud network session, which is further described below with reference to FIG. 1C.

Furthermore, the controller 120a may periodically save a session state for each session in a memory or any other storage means. As a result, information related to each session can be saved and retrieved in case the connection is broken between the navigation system 105a and the user device 140a or some other malfunction occurs.

As previously discussed, the controller 120a may enable navigation changes from both the navigation session 125a and the user device session 130a to be consolidated and merged. For example, navigation session 125a may be associated with a first set of navigation changes, which may set a destination along a particular route. Then, a user may establish communication between navigation system 105a and the user device 140a, thereby generating a user device session 130a. Through interaction with the user navigation application 142a on the user device 140a, a second set of navigation changes may then be generated. The second set of navigation changes may be stored or otherwise associated with the user device session 130a. Such changes may include setting certain points-of-interest along the particular route such as restaurants and landmarks. To this end, the controller 120a may consolidate and merge the first set and the second set of navigation changes into a combined set of navigation changes. Thus, a new route may be calculated that incorporates the points-of-interest and inputted destination.

As a result, the combined changes may be displayed on the navigation system 105a through display logic 135a into a single view. Alternatively, display logic 135a may render separate views for each set of navigation changes or otherwise distinctly indicate the different sets of navigation changes.

In some embodiments, the controller 120a may be able to resolve conflicting inputted routes. For example, the controller may select the most recently inputted route among conflicting routes. Alternatively, the controller 120a may present an overlay of all inputted routes to the display logic 135*a* to display. One of ordinary skill in the art would understand that various other methods of conflict resolution exist which are also contemplated within the present disclosure.

Figure 1B:
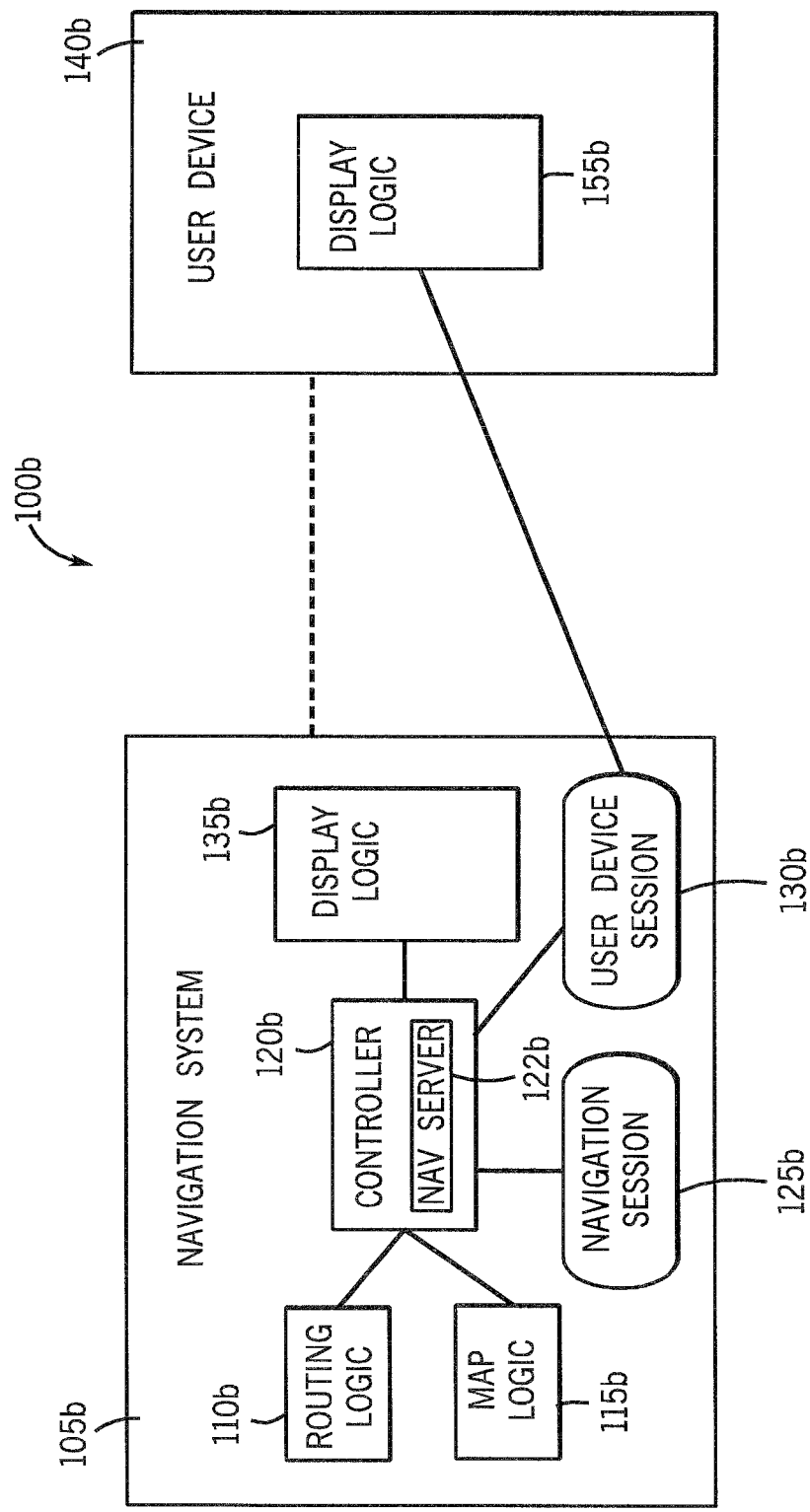
FIG. 1B is a system depiction for another embodiment of the present invention.
Figure 1C:
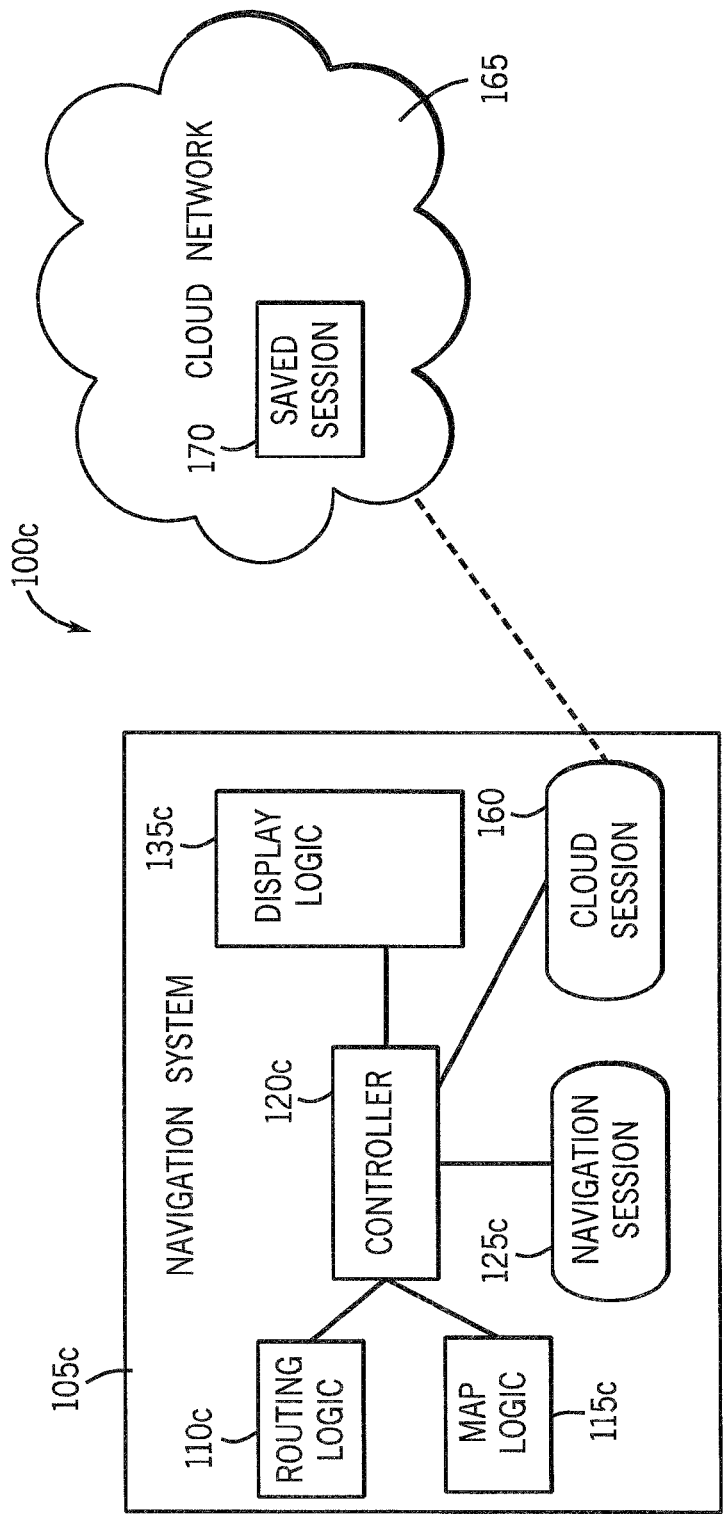
FIG. 1C is a system depiction for another embodiment of the present invention.

FIG. 1B depicts another embodiment of a system 100*b* for inputting navigation changes to a navigation system 105*b*. Particularly, the user device 140*b* may operate without the user navigation application 142*a* depicted in FIG. 1A. Thus, navigation system 105*b* may include a navigation server component 122*b* to communicate, through the user device session 130*b*, with display logic 155*b* of the user device 140*b* to provide a navigation interface for the user device 140*b*. To this end, the navigation system 105*b* may receive navigation changes from the user device 140*b* and store or otherwise associate the navigation changes in the user device session 130*b*.

Therefore, the user device 140*b* need not have its own navigation application in order to communicate with the navigation system 105*b*. Instead, the user device 140*b* may generate navigation changes directly on the navigation system 105*b* through the interface provide by the navigation server component 122*b*.

FIG. 10 provides yet another embodiment of a system 100*c* for inputting navigation changes to a navigation system 105*c*. In one embodiment, the navigation system 105*c* may interface with a cloud network 165 through a cloud session 160. Furthermore, a set of navigation changes may be stored in the cloud network 165 in a saved session state 170. For example, the saved session state 170 may have been previously uploaded from a user device. Thus, the navigation system 105*c* may generate a cloud session 160 to communicate with the cloud network 165 and retrieve the saved session state 170. To this end, the controller 120*c* may extract the navigation information associated with the saved session state. Again, the controller 120*c* may merge any navigation changes associated with the navigation session 125*c* with navigation changes in the cloud session 160*c*.

Therefore, navigation system 105*c* may not need to directly interact with user devices in order to incorporate any navigation changes made by the user devices. Instead, navigation changes may be stored or uploaded by the user devices into a saved session state 170 in the cloud network 165. The navigation system 105*c* may then communicate with the cloud network 165 to retrieve the saved session state 170 and extract the navigation changes.

In some embodiments, the controller 120*a-c* of the navigation system 105*a-c* and/or the user device 140*a-c* may be capable of storing session states in a data form suitable for emailing. Thus, various sessions (e.g., navigation session 125*a-c*, user device session 130*a-c*, cloud session 160, and/or saved session 170) may be emailed to or from different user devices 140*a-c*, the cloud network 165, and the navigation system 105*a-c*. For example, if multiple vehicles are in operation, a passenger of one vehicle may email navigation changes to a second passenger of a second vehicle. The second passenger may then transfer the navigation changes to the navigation system of the second vehicle.

Figure 2:
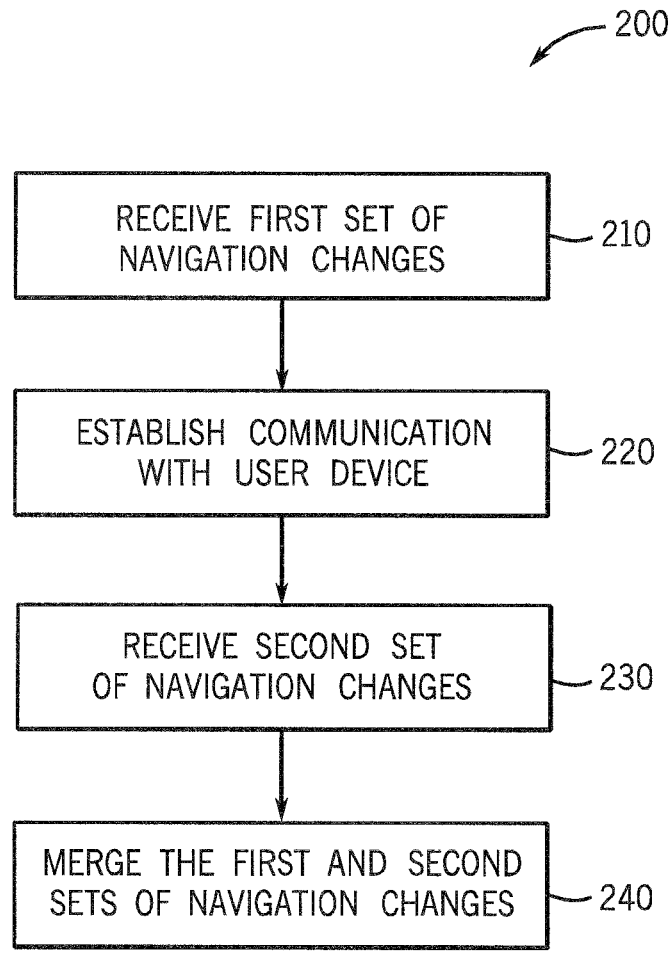
FIG. 2 is a flowchart for another embodiment of the present invention.

FIG. 2 is a flow diagram depicting a method 200 for managing navigation changes in a navigation system. In one embodiment, instructions for performing the method 200 may be stored on non-transitory computer readable medium. The method may begin in step 210 where a navigation system receives a first set of navigation changes. For example, a driver may input a particular destination and/or route to the navigation system. Moreover, these navigation changes may be stored in a navigation session managed by a controller within the navigation system. In step 220, communication between the navigation system and a user device may be established. As previously mentioned, the communication may be through any wired or wireless means as Bluetooth, WiFi, USB, or Ethernet. Furthermore, the communication between the navigation system and the user device may be maintained in a user device session through the controller in the navigation system.

In step 230, the navigation system may receive a second set of navigation changes from the user device. Furthermore, second set of navigation changes may be made by a user on his/her user device. In one embodiment, the user device may include a navigation application to perform the second set of navigation changes. Alternatively, the navigation system in the vehicle may include a navigation server component to provide an interface for the user device to generate the second set of navigation changes. In any case, the second set of navigation changes may be associated with the user device session.

In another embodiment with respect to step 220, communication may instead be established in a cloud session between the navigation system and a cloud network. Thus, the second set of navigation changes in step 230 may be stored in the cloud network in a saved session state. To this end, the navigation system may retrieve the second set of navigation changes from the saved session state in the cloud network.

Finally, in step 240, the controller within the navigation system may merge the first set of navigation changes with the second set of navigation changes. Again, it should be noted that FIG. 2 represents only one embodiment. In other embodiments, there may only be one set of navigation changes. For instance, the driver or any other user may simply make navigation changes on a user device and "push" or transfer these changes to the navigation system before operation of the vehicle. Thus, there may be no need to merge these navigation changes with any other navigation changes on the navigation system.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving a first set of navigation route changes in a computerized vehicular navigation system having a navigation application;
   wirelessly communicating between a user device, separate from said system and a server, said server to provide an interface to enable the user device to generate navigation changes directly on the navigation system, without using a navigation application of the user device;

establishing wireless communication between the navigation system and the server;
wirelessly translating a second set of navigation route changes from the user device to the navigation system via the server; and
merging the first set and the second set of navigation changes to create a new route on said navigational system based on the second set directly entered only on said user device.

2. The method of claim 1 further comprising generating a first session state associated with the first set of navigation changes.

3. The method of claim 2, further comprising generating a second session state for the user device to communicate with the navigation system, the second session state associated with the second set of navigation changes.

4. The method of claim 3, wherein the user device comprises a memory storing a user navigation application to generate the second set of navigation changes.

5. The method of claim 3, wherein the user device accesses a navigation server on the navigation system to generate the second set of navigation changes.

6. The method of claim 2, wherein the second set of navigation changes is stored in a cloud network in a second session state, the cloud network coupled to the navigation system.

7. The method of claim 6, wherein merging the first set of navigation changes and second set of navigation changes comprises:
retrieving the second session state from the cloud server; and
extracting the second set of navigation changes from the second session state to merge with the first set of navigation changes.

8. The method of claim 1, wherein one of the first set of navigation changes and the second set of navigation changes comprises a routing change.

9. The method of claim 1, wherein one of the first set of navigation changes and the second set of navigation changes comprises a point-of-interest change.

10. The method of claim 1 further comprising displaying a combined view of the merge between the first set of navigation changes and the second set of navigation changes.

11. A vehicular navigation system, comprising:
a memory; and
a controller to execute instructions stored in the memory, the instructions comprising:
wirelessly receiving a first set of navigation changes to the navigation system having a navigation application;
communicating between a user device, separate from said system and a server, said server to provide an interface to enable the user device to generate navigation changes directly on the navigation system, without using a navigation application of the user device;
establishing wireless communication between the navigation system and the server;
wirelessly translating a second set of navigation route changes from the user device to the navigation system via the server; and
merging the first set and the second set of navigation changes to create a new route on said navigational system based on the second set directly entered only on said user device.

12. The system of claim 11, wherein the instructions further comprise generating a first session state associated with the first set of navigation changes.

13. The system of claim 12, wherein the instructions further comprise generating a second session state for the user device to communicate with the navigation system, the second session state associated with the second set of navigation changes.

14. The system of claim 13, wherein the user device comprises a device memory storing a user navigation application to generate the second set of navigation changes.

15. The system of claim 13, wherein the navigation server further comprises a navigation server coupled to the controller, the navigation server providing an interface to the user device to generate the second set of navigation changes on the navigation system.

16. The system of claim 12, wherein the second set of navigation changes is stored in a cloud network in a second session state, the cloud network coupled to the navigation system.

17. The system of claim 16, wherein merging the first set of navigation changes and second set of navigation changes comprises:
retrieving the second session state from the cloud server; and
extracting the second set of navigation changes from the second session state to merge with the first set of navigation changes.

18. The system of claim 11, wherein one of the first set of navigation changes and the second set of navigation changes comprises a routing change.

19. The system of claim 11, wherein one of the first set of navigation changes and the second set of navigation changes comprises a point-of-interest change.

20. The system of claim 11 further comprising a display logic, coupled to the controller, to display a combined view of the merge between the first set of navigation changes and the second set of navigation changes.

21. A non-transitory computer-readable medium to store instructions executable by a processor, the instructions comprising:
receiving a first set of navigation changes to a vehicular navigation system having a navigation application;
wirelessly communicating between a user device, separate from said system and a server, said server to provide an interface to enable the user device to generate navigation changes directly on the navigation system, without using a navigation application of the user device;
establishing wireless communication between the navigation system and the server;
wirelessly translating a second set of navigation route changes from the user device directed to the navigation system via the server; and
merging the first set and the second set of navigation changes to create a new route on said navigational system based on the second set directly entered only said user device.

22. The medium of claim 21, wherein the instruction further comprise generating a first session state associated with the first set of navigation changes.

23. The medium of claim 22, wherein the instruction further comprise generating a second session state for the user device to communicate with the navigation system, the second session state associated with the second set of navigation changes.

24. The medium of claim 23, wherein the user device comprises a memory storing a user navigation application to generate the second set of navigation changes.

25. The medium of claim 23, wherein the user device accesses a navigation server on the navigation system to generate the second set of navigation changes.

26. The medium of claim 22, wherein the second set of navigation changes is stored in a cloud network in a second session state, the cloud network coupled to the navigation system.

27. .The medium of claim 26, wherein merging the first set of navigation changes and second set of navigation changes comprises:
   retrieving the second session state from the cloud server; and
   extracting the second set of navigation changes from the second session state to merge with the first set of navigation changes.

28. The medium of claim 21, wherein one of the first set of navigation changes and the second set of navigation changes comprises a routing change.

29. The medium of claim 21, wherein one of the first set of navigation changes and the second set of navigation changes comprises a point-of-interest change.

30. The medium of claim 21 wherein the instruction further comprise displaying a combined view of the merge between the first set of navigation changes and the second set of navigation changes.

* * * * *